United States Patent [19]

Srivastava et al.

[11] Patent Number: 4,729,023
[45] Date of Patent: Mar. 1, 1988

[54] MODE RECOGNITION FOR VERTICAL COUNTDOWN

[75] Inventors: Gopal K. Srivastava, Buffalo Grove; Julian Warrick, Palatine, both of Ill.

[73] Assignee: Zenith Electronics Corporation, Glenview, Ill.

[21] Appl. No.: 917,290

[22] Filed: Oct. 9, 1986

Related U.S. Application Data

[63] Continuation of Ser. No. 574,796, Jan. 27, 1984, abandoned.

[51] Int. Cl.⁴ .................................................. H04N 5/04
[52] U.S. Cl. ........................................ 358/148; 358/155
[58] Field of Search ............... 358/158, 155, 154, 153, 358/150, 148; 328/120; 375/108, 95

[56] References Cited

U.S. PATENT DOCUMENTS

| | | | |
|---|---|---|---|
| 3,903,474 | 9/1975 | Wiley | 328/120 |
| 3,995,109 | 11/1976 | McNay | 358/158 |
| 4,025,951 | 5/1977 | Eckenbrecht | 358/158 |
| 4,122,488 | 10/1978 | Mikado | 358/158 |
| 4,228,461 | 10/1980 | Weissmueller | 358/148 |
| 4,298,890 | 11/1981 | Lai et al. | 358/158 |

Primary Examiner—James J. Groody
Assistant Examiner—David E. Harvey

[57] ABSTRACT

An improved vertical countdown system for a television receiver which recognizes weak signal conditions in the received signal. Upon recognition of weak signal conditions or a noise indication from a noise dectector, circuitry provides a signal which is used to drive the receiver circuitry into a forced-standard operation mode for internally generating the vertical drive pulse. Circuitry is employed to monitor the received signal to determine whether sufficient vertical sync information is being received thus detecting whether the received signal is too weak. Also, compatible logic circuitry is monitored to determine whether the received signal has extraneous pulses normally characteristic of a noisy signal. Also, the circuit may be modified to increase or decrease its sensitivity to signal strength fluctuation.

16 Claims, 4 Drawing Figures

MODE RECOGNITION FOR VERTICAL COUNTDOWN

This is a continuation of U.S. application Ser. No. 574,796, filed Jan. 27, 1984, now abandoned.

BACKGROUND OF THE INVENTION

The present invention relates generally to the television receiving art and more particularly to the recognition of noisy or weak signal conditions in the received signal.

The N.T.S.C. regulates transmitted television signals as to their timing and the duration of particular subparts of the total transmitted signal. In particular, the N.T.S.C. regulations call for the transmission of vertical and horizontal sync information to be used by the receiver for synchronizing the horizontal and vertical sweep of the display screen in a raster-like fashion. In an ideal environment, the television receiver is responsive only to this synchronizing information which is carried on the transmitted signal and effectively coordinates the horizontal and vertical sweep of the display screen.

However, a television receiving system is seldom operated in an ideal environment. Typically, the transmitted signal is subjected to noisy static type conditions caused by extraneous electrical discharges and to attenuation due to atmospheric conditions and the distance over which the signal must travel. Quite frequently, the received signal is lacking in either signal strength or the synchronizing information or both. Without these it is difficult to produce a jitter-free display which is comfortable to watch.

Accordingly, it is desired to provide improved means for recognizing when a received television signal lacks the necessary characteristics to produce a sufficiently coordinated display comfortable for the ordinary viewer. It is also desired that such means operate in a fashion compatible with the remainder of the receiving circuitry and efficiently and advantageously make use of the signals which are normally available inside a television receiving set. Additionally, it is desired that the signal recognition means be durable, dependable, and of relatively low cost.

Therefore, it is a primary object of the present invention to provide a means and method for analyzing the sync characteristics of received signals to recognize signals which are too weak for providing an acceptable displayed picture and to provide for compensation for such signals to create an acceptable displayed picture.

It is an additional object of the present invention to provide for the compatibility between a recognition system and existing methods and systems within a television receiver.

It is still a further object of the present invention to provide dependable, durable and cost efficient means and method for recognizing weak signals.

SUMMARY OF THE INVENTION

The present invention, as mentioned, is used for ensuring proper vertical drive despite a noisy or weak signal. With regard to the "weak signal" responsiveness of the invention, circuitry examines the integrated vertical signals which are generated in response to the signal received from the signal source (usually an antenna or subscription service cable). If such integrated vertical signals are numerous enough over a given or defined epoch, then the circuitry concludes that there is not a weak signal being received. In the preferred embodiment, there must be at least two integrated vertical pulses in three television fields. If this condition is detected, then a "weak signal" indication signal is not activated. But, if too few integrated vertical pulses occur, then a "weak signal" signal is emitted which trips a "forced standard mode" of operation by a system within the television reciever itself to generate vertical drive signals by means of a countdown circuit. When the "weak signal" is no longer detected, the forced standard mode is no longer required to compensate for the lack of I.V. information. The preferred embodiment cooperates with a prior art Zenith vertical countdown system with noise immunity described in U.S. Pat. No. 4,298,890 entitled "Digital Vertical Synchronization System For A Television Receiver."

BRIEF DESCRIPTION OF THE FIGURES

The features of the present invention which are believed to be novel are set forth with particularity in the appended claims. The invention, together with its objects and the advantages thereof, may best be understood by reference to the detailed description taken in conjunction with the accompanying drawings of which:

DESCRIPTION OF THE PREFERRED EMBODIMENT

Figure 1:
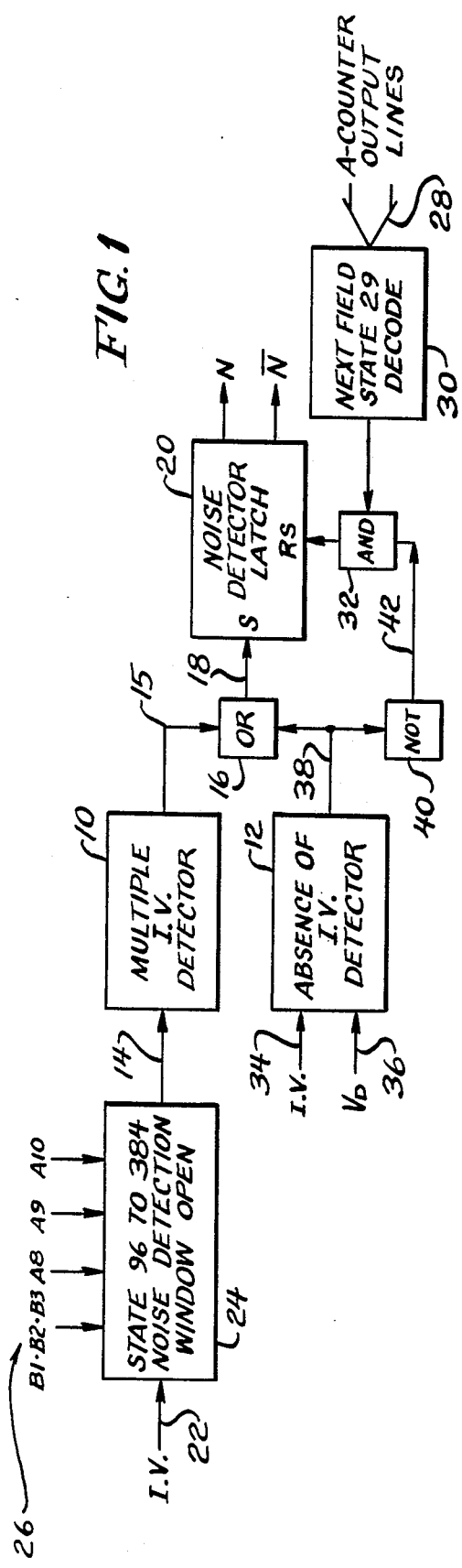
FIG. 1 is a representational block diagram of one embodiment of the present invention.

The improved mode recognition circuit of the preferred embodiment of the present invention recognizes when the received signal at a television receiver is too weak or too noisy. More particularly, one aspect of the preferred embodiment looks for the absence or presence of integrated vertical during specified time periods. Additionally, the preferred embodiment uses different criteria to determine whether a low signal or a noisy signal is present.

In a prior system at Zenith which is set forth more particularly in U.S. Pat. No. 4,298,890, Lai, et al., issued Nov. 3, 1981, a counter receives signals at a 2H rate for each vertical sync period. The I.V. signal presets the counter to "20," and a count of "545" was decoded and compared with the integrated vertical sync signal I.V. If there was coincidence for seven fields, then standard mode would be used, but if there were seven consecutive mismatches, the system would enter a nonstandard mode. The present invention described herein will detect the absence of the integrated vertical sync signal I.V. which will occur if there is a weak signal. If the transmitted (received) signal for vertical sync is weak, then one aspect of the present invention will be to declare when to switch to the forced standard mode wherein the counter is used for generating vertical sync. If there is a nonstandard signal source, such as a computer generated video output, there will probably be a very strong integrated vertical sync. On the other hand, if the television receiver is using an antenna to detect a far off signal, the video picture may be quite snowy and the picture may roll. The present invention will detect the weakness in the vertical sync and will force the television receiver into standard mode so that the internal counter is used to generate vertical drive, thereby to avoid roll.

Another aspect of the present invention makes use of the prior art equipment. In the prior art, if there were plural integrated sync signals received in one field between "state 96" and "state 384" of the 545 counter (with a 20-count offset), the prior art system declared that noise existed and forced the system into standard mode. The present invention looks for the absence of vertical sync and uses the same noise detector flip-flop to force the system into standard mode.

In this sense, the present invention is compatible with the prior system. However, the present invention also modifies the prior invention to some extent. In the prior system, the noise detector flip-flop, which produced the forced-standard mode signal, was reset once per vertical field. In contrast, the present invention allows this flip-flop to be reset only if a weak signal indication from the new circuitry is not present.

The improved mode recognition circuitry of the present invention may have other applications but is particularly useful when used in conjunction with a video receiver in a video communication system utilizing digital components and having internal signals representative of the field scanning rate derived from the transmitted vertical synchronizing information and other compatible circuits. Accordingly, the invention will be described in terms of use in that environment.

As mentioned, the N.T.S.C. regulates television signals as to the timing and synchronizing information normally transmitted as part of the composite signal. In particular, the N.T.S.C. regulations call for the regular transmission of vertical sync information in a vertical blanking interval once per field. It is this characteristic which the preferred embodiment of the present invention exploits in determining whether a weak or noisy signal is present.

Other circuits such as that disclosed in U.S. application Ser. No. 540,740, now U.S. Pat. No. 4,641,189 by Warrick, filed Oct. 11, 1983 and assigned to Zenith Radio Corporation, the teachings of which are incorporated by reference herein, are capable of recognizing vertical sync information occuring during vertical blanking intervals and responsively generating an integrated vertical (I.V.) pulse. Thus, an integrated vertical pulse is typically available within a television receiver once and only once per vertical field.

The characteristic number of integrated vertical pulses per vertical field in a normal signal is capitalized upon in the preferred embodiment described herein. Specifically, a testing procedure which looks for the presence or absence of the integrated vertical pulse is used to determine whether a weak or noisy signal is present. More specifically, if more than one integrated vertical pulse is recognized per vertical field, a noisy signal is present. On the other hand, if integrated vertical pulses are not detected during a prescribed number of vertical fields, it is likely that a weak signal is present.

FIG. 1 illustrates a general block diagram showing the various functions and interconnections of the low signal and noise detector circuits of the preferred embodiment. Specifically, there are two detectors 10 and 12 for detecting multiple I.V. or detecting the absence of I.V., respectively. More particularly, the multiple I.V. detector 10 receives I.V. pulses which occur during a specified noise window (discussed more thoroughly below) on a line 14. When more than one I.V. pulse is detected per vertical field, the multiple I.V. detector 10 exhibits an output on line 15 to OR gate 16. In response, OR gate 16 provides a setting signal via line 18 to latch circuit 20. A noise detection window circuit 24 receives I.V. pulses as inputs on a line 22. The window circuitry also receives various counter outputs from other portions of the receiver circuitry (not shown) as inputs 26.

Generally, as mentioned above, such circuitry provides for a counter to be triggered by the receipt of vertical sync information to responsively count from state 0 to state 525. State 525 is significant because there are typically 525 one-half horizontal periods per vertical field. Based on the known frequency characteristics of the transmitted signal, complementary logic circuitry may decode the counter outputs for various purposes.

One such purpose is to internally generate a vertical drive pulse. This pulse may be used for many purposes, including phase comparison with the next received vertical sync pulses, as defined by I.V., of the transmitted signal and triggering the display scanning beam to return to the upper left corner of the picture screen rather than depending upon the recognition of received vertical sync information to trigger this important function.

This latter application is commonly referred to as standard mode operation. That is, the vertical scanning is controlled by the counter reaching the 525 state, typical of a standard vertical period, rather than relying on the sync characteristics of the transmitted signal which might include extraneous noise capable of generating a "false" vertical drive pulse or might contain no vertical sync information at all. It will be appreciated that the counter may be preset to any number of different states without affecting the performance of such a system as long as the decoding circuitry was correspondingly designed to reset the counter and trigger other desired functions at the correspondingly appropriate count.

The noise detection window created by the circuitry 24 is open from state 96 to state 384. Accordingly, inputs 26 to window circuitry 24 operate as decoded enabling signals. Thus, I.V. pulses are allowed on line 14 to multiple I.V. detector 10 when they occur between states 96 and state 384 of the counter (not shown).

After multiple I.V. pulses have been detected, the latch circuit 20 will typically be reset at state 29 of the next field. Accordingly, lines 28 from the prior art counter are inputs to a decode circuit 30 which presents the appropriate signal to the AND gate 32 when state 29 of the counter is detected by the decode circuitry 30. Thus, depending on the state of the low signal detector circuitry, discussed more thoroughly below, the occurence of state 29 will reset the latch circuit 20.

It will be appreciated then that during each vertical period count from 0 to 525, the multiple I.V. detector 10 will be looking for the occurence of another I.V. pulse between state 96 and state 384. If one is detected during this time, latch circuit 20 will be set to indicate that a noisy signal has been detected, and its outputs N and $\overline{N}$ may be used to trigger the receiver into forced standard mode operation. When a low signal has not been detected, as explained below, the noise detector latch 20 will be reset at state 29 of the succeeding vertical field.

As mentioned above, the multiple I.V. detector circuit 10 is sensitized, or enabled, to detect multiple I.V.

between states 96 and 384 of the vertical period count. This condition is typically imposed upon the circuit of the preferred embodiment to avoid generating a noise indication signal in response to "echoes" or "ghost signals" which occur frequently during a television transmission. In the envisioned environment of the preferred embodiment, it is not desired that such signals trigger the noise detection circuitry.

The preferred embodiment also seeks to recognize the conditions which represent an absence of integrated vertical during a prescribed number of vertical field periods, i.e. a "weak" signal. Referring to FIG. 1 again, therein is shown a detector 12 which is arranged to detect the absence of I.V. which receives as inputs both integrated vertical pulses I.V. on a line 34 and a vertical field rate signal on a line 36. Detector 12 then operates to search for I.V. pulses during a predetermined number of vertical fields. Upon a finding that a sufficient number of integrated vertical pulses are not present during the prescribed number of vertical fields, an output signal is generated on a line 38 which is then branched to OR gate 16 and inverter 40. The signal received by OR gate 16 generates a latch setting signal on line 18 for latch circuit 20. The presence of the output signal on line 38 is inverted by gate 40 and then communicated to AND gate 32.

It will be appreciated that in the configuration of FIG. 1 the latch circuit 20 will be latched to a noise indication (where N is true, or high) upon receipt of an output signal on line 38 until the output signal on line 38 once again goes low. That is, when the signal on line 38 is high, the signal on line 42, which communicates between inverter 40 and AND gate 32, will be low. Thus, that input will control AND gate 32 which will keep the reset to latch circuit 20 low. Latch circuit 20 may be reset only when the signal on line 38 goes low, which is indicative of the detection of integrated vertical. Inverter 40 will then release AND gate 32 to be controlled by decode circuitry 30 which will reset latch 20 at the next "state 29" decode.

In the circuitry of the preferred embodiment, the latch outputs $\overline{N}$ and N may be used to drive other circuits to trigger the television receiver to operate in a forced standard mode in which the television circuitry itself will generate the vertical drive pulse every 525 counts of the counter by means of a countdown circuit, as is quite well known. Thus, if a noisy signal is detected at the multiple I.V. detector 10 or a low signal is detected at the absence of I.V. detector 12, the television receiver will be forced into a standard mode by the output signal of latch 20. Accordingly, the television set will generate its own vertical drive pulse every 525 counts, thus keeping the screen from jittering when a weak signal or a noisy signal is received.

Figure 2:
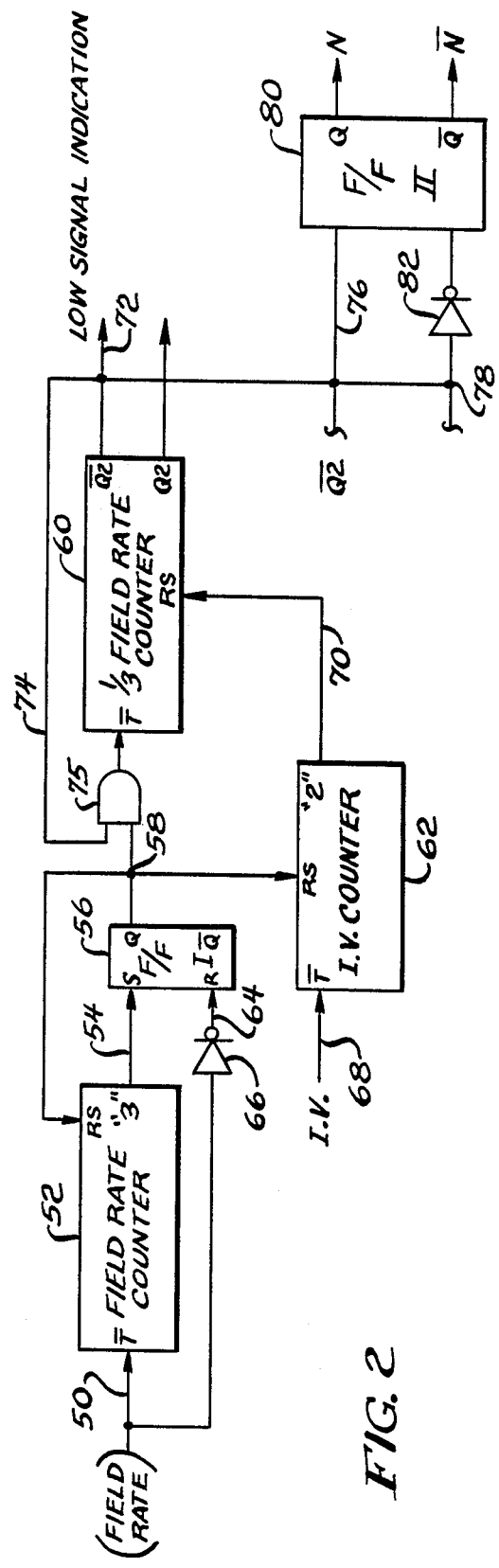
FIG. 2 is a representational block diagram of a weak (low level) signal detector and an associated latch circuit according to one aspect of the present invention.

FIG. 2 shows a more detailed block diagram of the of the "absence of I.V." detector 12 of FIG. 1. Specifically, a field rate signal, which is typically available within the television receiver, is received on a line 50 by a field rate counter 52. This counter 52 counts up to state "3" and produces an output signal on a line 54 to a set/reset flip-flop 56. When flip-flop 56 is set, it produces a high signal on a line 58. This signal on line 58 is received by a one-third field rate counter 60, a reset input to an I.V. counter 62, and a reset input to field rate counter 52. Thus, upon the count of "3" from the field rate counter 52, flip-flop 56 is set, I.V. counter 62 is reset and field rate counter 52 is reset all within a time period determined by the switching speed characteristics of the circuit components.

When the field rate pulse ends, the signal on a line 64 at the output of an inverter gate 66 goes high, thus resetting flip-flop 56 and causing the signal on line 58 to go low. The trailing edge of this signal toggles the one-third field rate counter 60 to count up one state. During this same period, the I.V. counter 62 receives integrated vertical pulses on a line 68 from other circuitry in the television receiving set, if vertical sync information is present in the received signal, and accumulates a count of the number of I.V. pulses which occur between reset pulses received via line 58. When I.V. counter 62 reaches a "state 2," it exhibits a signal on a line 70 which resets the one-third field rate counter 60. That is, in the preferred embodiment field rate counter 52 counts to "state 3" I.V. counter 62 counts to "state 2," and one-third field rate counter 60 counts to "state 2." (Note: counter 60 toggles on the trailing edge of the output pulse from field rate counter 52. Thus, it is toggled to "state 1" by the same pulse which resets I.V. counter 62.)

In preferred embodiment, one-third field rate counter 60 exhibits a weak signal indication when it reaches "state 2." That is, Q2 is "high," and $\overline{Q2}$ is low. Accordingly, a weak signal indication will be exhibited whenever I.V. counter 62 does not detect at least two I.V. pulses during each three field interval in order to reset one-third field rate counter 60 before it reaches "state 2." Thus, the circuit of the preferred embodiment looks for an "absence" of at least two I.V. pulses during each three field interval in the received signal.

From the foregoing, it will be appreciated that the weak signal indication is provided by one of the outputs of counter 60. If counter 60 has just been reset, it will be at state "1". Field counter 52 will count the next three vertical fields. When it reaches a count of "3" flip flop 56 will reset IV counter 52 and will toggle counter 60. Counter 60 will advance to state 2 unless it has been reset by counter 62. If counter 60 reaches state "2", this indicates a low signal. The low signal indication will be prevented if IV counter 62 reaches a state of "2" before it is itself reset. Its reset occurs once each three fields. Thus, the window in this embodiment can be regarded as three fields occurring after a reset of counter 60. If counter 62 does not detect two IV pulses within that time window, it will not reset counter 60, and the third field counted by counter 52 will ultimately toggle counter 60 to state "2" causing a weak signal output.

It is envisioned that this configuration of the preferred embodiment may be altered for differing reasons without escaping the scope of the present invention. For example, the I.V. counter 62 may be made to count to a different, higher or lower, state before the reset to one-third field rate counter 60 is triggered. Also, decoding circuitry may be inserted between the outputs of I.V. counter 62 and one-third field rate counter 60 for processing of the reset signal or otherwise reconfiguring the counter circuitry.

As a more general overview, the field rate counter 52 accumulates a count of field rate pulses which occur. At a predetermined count, counter 52 generates an output pulse which is processed through flip-flop 56 to reset I.V. counter 62 and counter 52 so that each begins accumulating a new count. Thus, field rate counter 52 defines a time window which has a width corresponding to the predetermined field count at which an output pulse is generated.

Correspondingly, I.V. counter 62 accumulates a count of the I.V. pulses which occur during the time window defined by field rate counter 52. That is, counter 62 accumulates a count of I.V. pulses which occur during the period between reset signals received by counter 62 from the flip-flop 56. At some predetermined count, I.V. counter 62 generates a pulse which resets one-third field rate counter 60. Thus, one-third field rate counter 60 will be reset only if I.V. counter 62 reaches a predetermined count during the time window defined by field rate counter 52.

One-third field rate counter 60 communicates with flip-flop 56 to accumulate a count of counter 52 output pulses. At a predetermined count, counter 60 exhibits a "weak signal" output signal. However, one-third field rate counter 60 will exhibit a "weak signal" output only if it reaches the predetermined count before it is reset by I.V. counter 62. Thus, one-third field rate counter 60 will exhibit a "weak signal" indication if I.V. counter 62 fails to accumulate some predetermined count of I.V. pulses during each of some predetermined number of time windows of some predetermined duration as defined by field rate counter 52.

The circuit of the present invention looks for an absence of I.V. during an interval corresponding to some number of vertical fields and indicates a "weak signal" when some number of those absences are detected. Accordingly, the sensitivity of the circuitry is determined by the respective predetermined counts at which the three counters 52, 60, and 62 generate outputs.

The "weak signal" criteria used in the preferred embodiment are determined by balancing the need to quickly recognize when a weak signal is being received against the undersirability of unnecessarily triggering forced mode operation. For that reason, the preferred embodiment looks for only at least two I.V. pulses within a three field interval. Similarly, the preferred embodiment generates a "weak signal" indication if only one such interval is detected.

The system could be made more sensitive to weak signals by looking for three I.V. pulses in each three field interval. Alternatively, the system could be made less sensitive by requiring two or more "failed" intervals before a weak signal is indicated. Likewise, there are any number of other variations which could be used to accomplish the same result e.g. shortening or lengthening the time window and/or looking for more or fewer I.V. pulses during the time window and/or repeating the test a greater number of times.

When one-third field rate counter 60 counts to a "2" state its Q2 output goes high, its $\overline{Q2}$ output on line 72 goes low which then latches the $\overline{T}$ input to counter 60 to a low state via line 74 and AND gate 75, precluding counter 60 from advancing to a higher count. It is the Q2 "high," $\overline{Q2}$ "low" state which is the "weak signal" indication at the outputs of counter 60.

Output $\overline{Q2}$ on line 72 also goes to input lines 76 and 78 of a flip-flop 80 which corresponds to the noise detector latch 20 of FIG. 1. It will be appreciated that the presence of a low signal at both lines 76 and 78 and the inverting gate 82 operate to keep the flip-flop 80 in a condition of N="1", $\overline{N}$="0" until the $\overline{Q2}$ signal goes high, which occurs only when one-third field rate counter 60 is reset. As mentioned above, the N="1", $\overline{N}$="0" condition is that which corresponds to the forced standard mode or the low signal/noise detected state.

Figure 3:
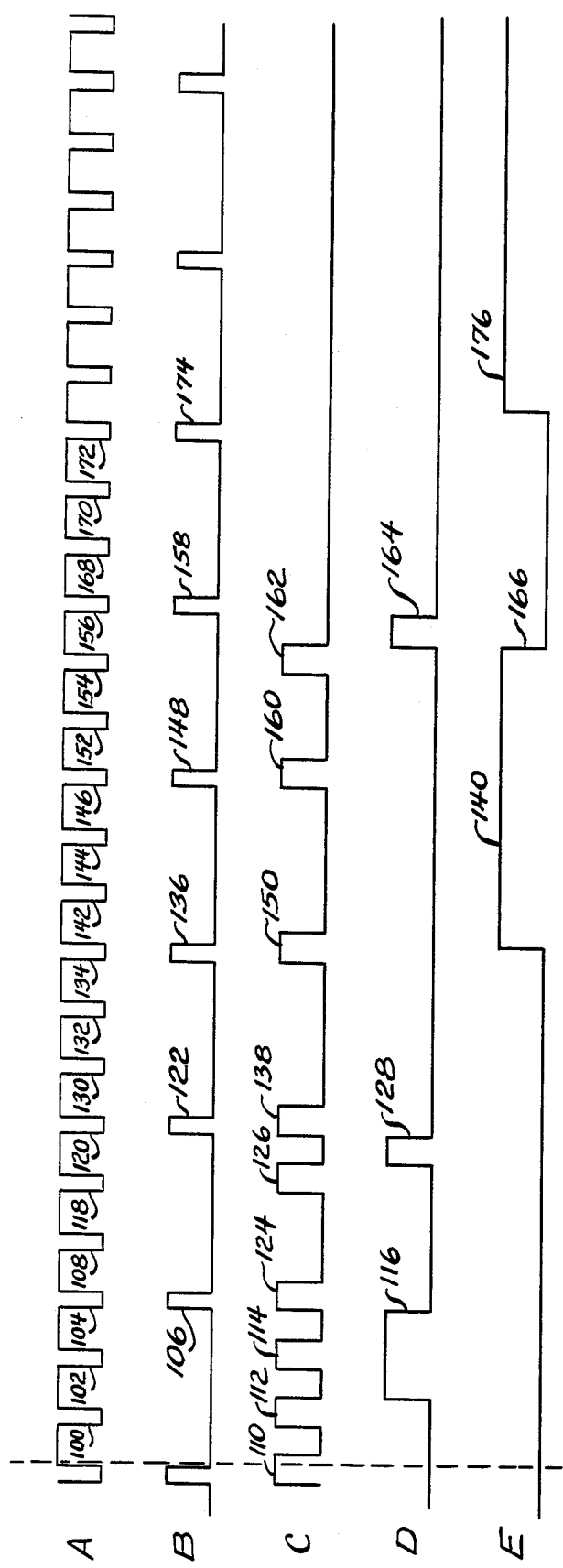
FIG. 3 is a collection of waveforms representative of the signals at various points throughout the circuit of the preferred embodiment.

The operation of the preferred embodiment of the present invention may be better understood by reference to FIG. 3 wherein is shown a series of waveforms representing the timing diagrams associated with the preferred embodiment described herein. Waveform A represents the inverted field rate input to the field rate counter 52 of FIG. 2. This signal is available from numerous sources within the television receiving set as is known throughout the art. Although the signal may vary in frequency, it will be constant to the degree that a pulse will always occur once per vertical field. Waveform B then represents the output of flip-flop 56 on line 58. It is apparent from these illustrated waveforms that the output pulses on line 58 occur once every three vertical fields as counted by field rate counter 52. As mentioned above, this is the signal which is used to reset I.V. counter 62 and field rate counter 52. Also, it is the trailing edge of this signal which toggles the one-third field rate counter 60 of FIG. 2.

Waveform C of FIG. 3 illustrates an example of the integrated vertical sync pulse signal, I.V., which may be detected during any typical, transmitted signal. It should be noted that in the circuitry of the preferred embodiment, it is the trailing edge of each vertical sync pulse of waveform C that is counted by the I.V. counter 62.

In accordance with the above descriptions, it will be appreciated that as field rate counter 52 toggles in response to the negative going edge of inverted field rate pulses 100, 102 and 104 in waveform A, it will accumulate a "3" state and toggle flip-flop 56 to produce a pulse 106 in waveform B. The positive going edge of negative pulse 104 will then terminate pulse 106. Meanwhile, I.V. counter 62 will count I.V. pulses 110 and 112 and will accumulate a "2" count as represented by waveform D which is the signal on line 70 in FIG. 2. This creates a pulse 116 which is in turn cut short by the occurence of pulse 106 in waveform B as the I.V. counter 62 counts to a "3" state. This pulse 116 resets one-third field rate counter 60 before it can accumulate a "2" count to drive low its $\overline{Q2}$ output on line 72. Consequently, there is no weak signal indication, Q2, as shown by the first portion of waveform E of FIG. 3.

However, field rate counter 52 is then reset and proceeds to count pulses 108, 118 and 120 and produce another toggling pulse 122 in waveform B. Meanwhile, I.V. counter 62 has received I.V. pulses 124 and 126 and again accumulated a "state 2" count which is generated as an output on line 70 and representd by a pulse 128 in waveform D. Again, this resets the one-third field rate counter 60 to prevent it from generating a "high" Q2 output indicative of a weak signal detection.

It will be appreciated that throughout this time the one-third field rate counter 60, which toggles on the trailing edge of the pulses of waveform B, will be set to the "1" state by each of pulses 106 and 122. However, because of the resetting action of the pulses 116 and 128 in wave-form D on lines 70, the "2" state, indicative of a low, or weak, signal, is not reached.

However, such is not the case if a weak signal is present. After field rate counter 52 counts pulses 130, 132, and 134, an output pulse 136 is generated on line 58, which resets I.V. counter 62 for the next counting interval. During the interval between resetting pulses 122 and 136, I.V. counter 62 counts only the trailing edge of I.V. pulse 138 so it does not reach a "2" state. Consequently, a resetting pulse is not generated on line 70 to reset the one-third field rate counter 60. Thus, the trailing edge of pulse 136 toggles one-third field rate counter 60 again to generate a "2" state which is represented in waveform E as a Q2 pulse 140. The logical inverse of this signal is the $\overline{Q2}$ output of the one-third field rate counter 60, which is used to indicate via line 72 that a low signal has been detected. The $\overline{Q2}$ signal is also used to latch the input to the one-third field rate counter 60 via line 74 and AND gate 75.

While pulse 140 endures, the field rate counter 52 continues to count pulses 142, 144, and 146 and provides an output pulse 148 on line 58. However, during this period the I.V. counter 62 only counts the trailing edge of I.V. pulse 150, and thus, only reaches the "1" state, having been reset to "0" by pulse 136. Consequently, a reset pulse indicative of the "2" state from I.V. counter 62 is not presented via line 70 to the reset of one-third field rate counter 60. Thus, the Q2 pulse 140 continues through this period. Also, the trailing edge of pulse 148 does not toggle the one-third field rate counter 60 because of the low $\overline{Q2}$ signal on line 74 at the input to AND gate 75 thus latching the input to the one-third field rate counter 60. However, pulse 148 resets I.V. counter 62 for the next counting interval as explained above.

Once again, the field rate counter 52 continues to count throughout this period, and pulses 152, 154 and 156 result in a pulse 158 on line 58. During this interval, I.V. counter 62 counts the trailing edge of each of I.V. pulse 160 and 162. This causes a "2" count indication pulse 164 on line 70, which resets the one-third field rate counter 60 as seen in waveform E by the trailing edge 166 of Q2 pulse 140. When the low noise indication on line 72 ceases, flip-flop 80 is released from its N="1", N="0" state, as explained above.

The circuit is then reconfigured and once again begins counting pulses 168, 170 and 172 in waveform A to generate a pulse 174 in waveform B on line 58. During this time, I.V. counter 62 counts no I.V. pulses and does not toggle. This prohibits the generation of a reset pulse on line 70. Consequently, the one-third field rate counter 60 toggles to the "2" state, thus generating a Q2 pulse 176 shown in waveform E. As explained above, this latches the one-third field rate counter 60 and flip-flop 80 until at least two I.V. pulses are again detected during a three field interval determined by the field rate counter 52.

As mentioned previously, the criteria for deciding whether a sufficient number of I.V. pulses have been detected during a predetermed number of vertical fields is readily changable. Changing the accumulated counts which are decoded from the various counters makes it possible to alter the criteria which will trigger the low signal indication. Such changes and modification will be readily apparent to one skilled in the art who has become familiar with the teachings of this specification. The circuit could be made less sensitive to low signals by simply changing the triggering output from the one-third field rate counter 60 from a "2" count to a "3" count. This would change the criteria necessary for a "failed" test to an absence of at least two I.V. pulses in every three fields for at least two consecutive sets. Thus, the system may be made more or less sensitive to signal strength as may be desired.

The choice of testing for the presence of integrated vertical is based upon the fact that a standard signal is quite frequently weak. However, if a television receiving set is operating in a non-standard environment, e.g. in conjunction with a home computer, a video game, or a video cassette recorder, the signal and the integrated vertical synchronizing pulses will normally be quite strong. Accordingly, there will seldom be a situation in which at least two integrated vertical pulses will not be detected during each three field interval in the nonstandard signal. Thus, it is safe to test for weak signal conditions by testing for the absence of integrated vertical over a specified time period.

Figure 4:
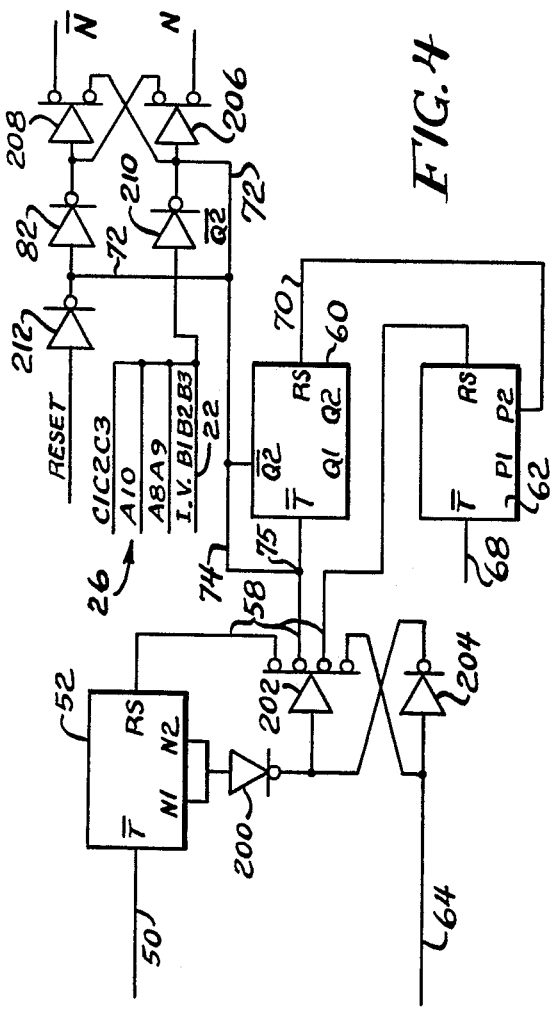
FIG. 4 is a detailed schematic of one circuit embodying the present invention.

Referring now to FIG. 4, therein is shown a detailed logic schematic of the circuit of the preferred embodiment employing integrated injection logic. Particularly, counters 52, 60 and 62 are shown as well as the input lines 50 and 64, all mentioned above. The gates and interconnections between the counters via lines 58, 70, and 74 are also shown. Flip-flop 56 (FIG. 2) comprises gates 200, 202, and 204. In this circuit, the "3" state is detected and decoded by combining the binary "1" and "2" outputs of counter 52.

FIG. 4 also illustrates the flip-flop 80 from FIG. 2, including gates 206 and 208. The latching action of the $\overline{Q2}$ signal on line 72 to gates 206 and 82 may be more fully appreciated from this diagram. Specifically, gates 206 and 208 comprise a set/reset flip-flop. By placing inverting gate 82 at the reset input to this flip-flop, the same low signal on line 72 which sets the flip-flop may be used to disable the reset input as shown.

Also, in this configuration, gate 210 operates as the multiple I.V. detector 10 of FIG. 1 with input from the noise detection window circuitry 24, shown generally as a series of AND gates having counter inputs 26, and an input on line 22 for the I.V. pulses. Similarly, gate 212 operates as the state "29" decode circuitry 30 of FIG. 1.

It is not required for the operation of the invention disclosed herein that the circuit implementing it be that of FIG. 4, or even necessarily that of FIGS. 1 or 2. These are intended merely to illustrate the preferred embodiment and one configuration using a small number of gates. It will be appreciated that this is accordance with one stated objective of the present invention which is to minimize cost. However, other circuit configurations may be equally effective while using more or different gates and elements yet would still be within the spirit and scope of the present invention.

For example, field-rate counter 52 and its supporting circuitry may be replaced with other suitable circuitry capable of defining the desired time window for scrutinizing the received signal. Likewise, one-third field rate counter 62 may be replaced with other suitable circuitry for generating the low signal indication when sufficient vertical synchronizing information is absent.

Similarly, different elements may be used to effectuate particular circuit functions without escaping the scope of the present invention, e.g. substitution of a different type of logic gate than the ones which are illustrated in FIG. 4. Such substitutions would be apparent to one skilled in the art and familiar with the teachings of this application. Likewise, differing video systems may utilize somewhat differently configured vertical sync information. It may also be necessary to change the criteria for detection of a low signal or noisy condition as explained above. It is envisioned that such changes as would be readily apparent are within the spirit and scope of the present invention and such changes can be readily made in the circuit and would be apparent to one skilled in the art and familiar with the teachings of this application.

In the following claims, reference is made to deriving sync pulses or derived sync pulses. This is intended to encompass any sync pulses which are derived from the signal which is received by the television system, and includes the so called "integrated vertical sync signal" and others.

What is claimed is:

1. In a method for vertical synchronization of a television system which digitally locally develops vertical sync pulses, derives vertical sync pulses from a received television signal, and selectively applies the locally developed sync pulses or the derived sync pulses to a vertical sweep system of the television system, the improvement comprising the steps of:

defining a time window having a beginning and an end;
   accumulating a count of the derived sync pulses occurring within said time window;
   resetting said count of derived vertical sync pulses to a preset starting count in response to the end of said time window;
   determining whether fewer than a predetermined number of said derived sync pulses occur within said time window;
   said determining step including toggling a logic device in response to the beginning of said time window; and
   if said determining step indicates that fewer than said predetermined number of derived sync pulses occur within said time window, then triggering said logic device to generate a signal in response to the end of said time window and signaling said television system to apply said locally developed sync pulses to said vertical sweep system.

2. The method of claim 1 wherein said step of defining a time window includes accumulating a count of vertical field time intervals and said resetting step comprises resetting said count of desired vertical sync pulses when the count of vertical field time intervals reaches a predetermined number.

3. The method of claim 1 including disabling said logic device when said count of derived vertical sync pulses reaches said predetermined number of said derived vertical sync pulses.

4. In a method for vertical synchronization of a television system which digitally locally develops vertical sync pulses, derives vertical sync pulses from a received television signal, and selectively applies the locally developed sync pulses or the derived sync pulses to a vertical sweep system of the television system, the improvement comprising:

maintaining a first count representing accumulated vertical field time intervals and resetting said count periodically.
   maintaining a second count representing accumulated derived vertical sync pulses;
   resetting said second count in response to said first count reaching a first predetermined number;
   toggling a logic device in response to said first count reaching said first predetermined number;
   resetting said logic device in response to said second count reaching a second predetermined number; and
   signaling said television receiver to apply the locally developed sync pulses in response to said logic device being toggled to a predetermined one of its states, whereby said signaling will occur unless said second predetermined number of derived sync pulses is reached before said first predetermined number is reached.

5. In a method for vertical synchronization of a television system which digitally locally develops vertical pulses, derives vertical sync pulses from a received television signal, and selectively applies the locally developed sync pulses or the derived sync pulses to a vertical sweep system of the television system, the improvement comprising:

detecting noise in said received signal including defining a first time window during each of a plurality of vertical fields, detecting any of said derived vertical sync pulses from said received television signal which occur during said first time window, and actuating a logic device to provide a noisy signal indication in response to the detection of said pulses during said first time window;
   detecting a low sync pulse signal strength in said received signal, including defining a second time window having a relationship to the vertical sync frequency of the television system, detecting any of the derived vertical sync pulses which occur during said second time window and an absence of a first predetermined number of said derived vertical sync pulses which occur during said second time window, and actuating said logic device in response to the detection of said absence of pulses; and
   signalling said television system to apply said locally generated sync pulses to said vertical sweep system in response to said logic device being actuated, whereby the logic device is used for signaling a condition when either the noise or low signal strength is detected.

6. The method of claim 5 wherein said step of defining a first time window comprises:

initializing a counter at the beginning of each of said vertical fields and accumulating a count during each of said vertical fields;
   decoding a first value of said count accumulated by said counter;
   enabling said first time window in response to said decoding said first value;
   decoding a second value of said count of said counter; and
   disabling said first time window in response to decoding said second value.

7. The method of claim 5 wherein said step of defining a second time window includes accumulating a count of vertical field time intervals and resetting said count when it reaches a second predetermined number.

8. The method of claim 7 wherein said step of detecting any of said derived vertical sync pulses which occur during said second time window includes accumulating a count of any of said derived pulses which occur during said second time window.

9. The method of claim 8 further including resetting said count of derived sync pulses to a preset starting count at the close of said second time window.

10. The method of claim 9 wherein said step of detecting a low signal strength includes enabling a further logic device in response to the opening of said second time window and triggering said further logic device to generate a signal when said second time window closes.

11. The method of claim 10 further including disabling said further logic device when said count of said derived vertical sync pulses reaches said first predetermined number of said derived sync pulses.

12. The method according to claim 11 including
resetting said count of derived pulses in response to said count of vertical field time intervals reaching said second predetermined number;
toggling said further logic device in response to said count of vertical field time intervals reaching said second predetermined number;
resetting said further logic device to one state in response to said count of derived pulses reaching said first predetermined number; and
signaling said television system in response to said further logic device reaching another state, whereby said signaling will occur unless said first predetermined number of derived sync pulses is detected before said second predetermined number of vertical fields is detected after said further logic device is reset.

13. In a vertical synchronization system for a television system which digitally locally develops vertical sync pulses and derived vertical sync pulses from a received television signal and includes means for selectively applying the locally developed sync pulses or the derived sync pulses to a vertical sweep system of the television, the improvement comprising:
means for defining a time window having a beginning and an end, said means for defining a time window including means for accumulating a count of vertical field time intervals and means for resetting said count when it reaches a predetermined number;
means for detecting derived vertical sync pulses which occur during said time window and for detecting whether a predetermined number of said derived vertical sync pulses occur during said time window, said means for detecting including means for accumulating a count of derived vertical sync pulses occurring during said time window and means for resetting said count of derived vertical sync pulses to a preset starting count at the close of said time window;
means responsive to said means for detecting for signaling said television system to apply said locally developed sync pulses to said vertical sweep system;
said means for detecting including a logic device, means for enabling said logic device in response to the beginning of said time window and for triggering said logic device to generate a signal when said time window ends.

14. The improvement of claim 13 wherein said means for detecting includes means for determining if fewer than a predetermined number of derived vertical sync pulses occur during said time window.

15. The improvement of claim 13 further including means for disabling said logic device when said count of derived vertical sync pulses reaches said predetermined number.

16. In a vertical synchronization system for a television system which digitally locally develops vertical sync pulses and derived vertical sync pulses from a received television signal and includes means for selectively applying the locally developed sync pulses or the derived sync pulses to a vertical sweep system of the television, the improvement comprising:
means for defining a time window having a beginning and an end, said means for defining a time window including means for accumulating a first count of vertical field time intervals and means for resetting said count when it reaches a first predetermined number;
means for detecting derived vertical sync pulses which occur during said time window and for detecting whether a second predetermined number of said derived vertical sync pulses occur during said time window; and
means responsive to said means for detecting for signalling said television system to apply said locally developed sync pulses to said vertical sweep system;
said means for detecting including a logic device, means for enabling said logic device in response to the beginning of said time window and for triggering said logic device to generate a signal when said time window ends,
said means for defining including a first counter coupled to receive signals at the vertical field rate and providing said first count and means for resetting said first counter periodically;
said means for detecting including a second counter coupled to receive the derived vertical sync pulses, means for resetting said second counter in response to said first count reaching said first predetermined number, said logic device having at least two states, means for toggling said logic device in response to said first count reaching said first predetermined number, means for resetting said logic device to one state in response to said second counter reaching said second predetermined number, said logic device providing an output to said means for signaling said television system in response to said logic device reaching another state, whereby said signalling occurs unless said second predetermined number of derived sync pulses is counted before said first number of vertical field time intervals is counted after said logic device is reset.

* * * * *